Inventor:
John C. Columbus

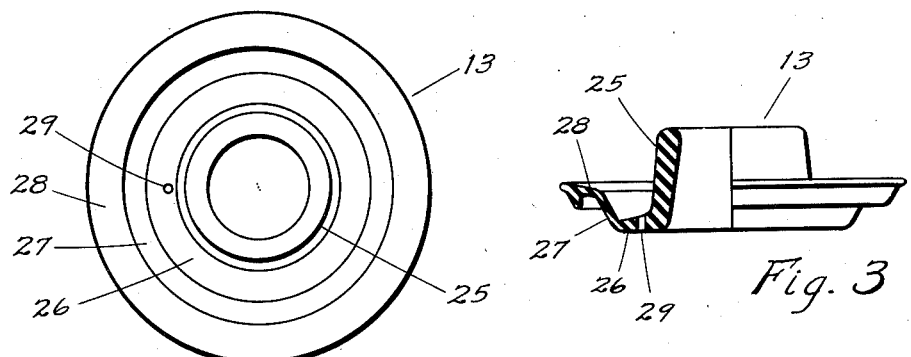
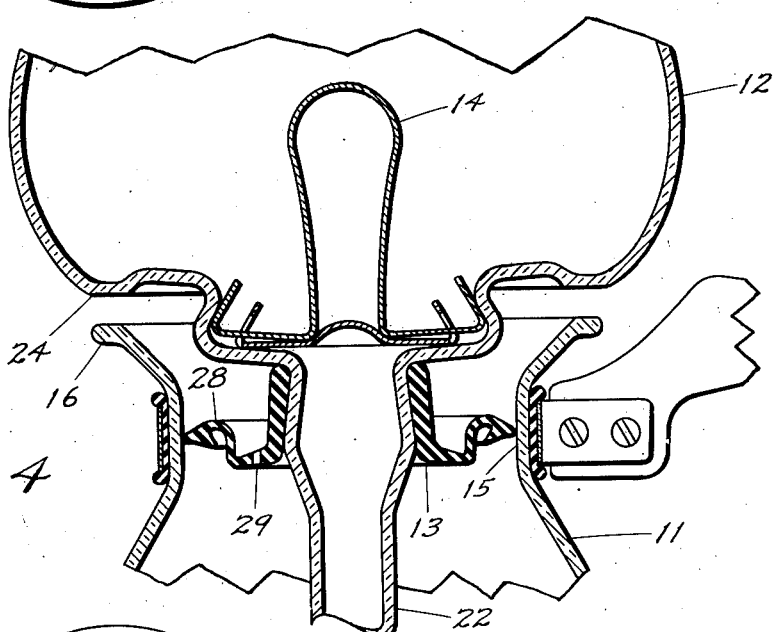
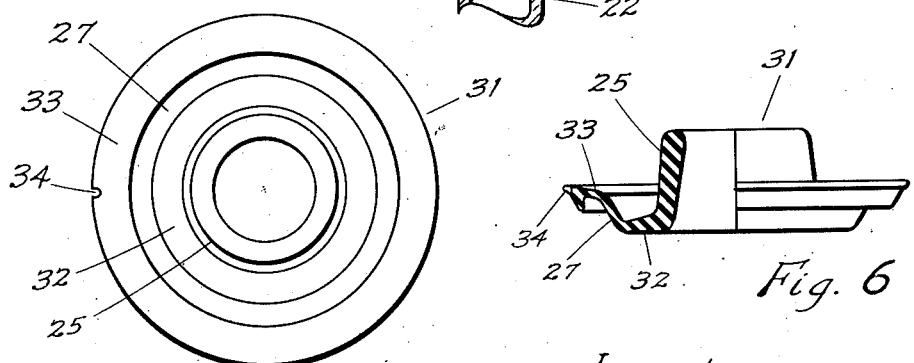
Inventor:
John C. Columbus

Aug. 12, 1952     J. C. COLUMBUS     2,606,490
VENTED COFFEE MAKER

Filed March 1, 1951     3 Sheets-Sheet 3

Inventor:
John C. Columbus

Patented Aug. 12, 1952

2,606,490

UNITED STATES PATENT OFFICE 2,606,490

VENTED COFFEE MAKER

John C. Columbus, Ferguson, Mo.

Application March 1, 1951, Serial No. 213,349

14 Claims. (Cl. 99—292)

This invention relates to devices of the vented pressure-vacuum type which are used principally for making infusions of coffee, and more particularly to novel and improved means in such devices for automatically accomplishing the venting of the lower container thereof during the pressure phase of operation to cause the infusion to take place within a desirable temperature range and within a comparatively short period of time, and for automatically sealing the venting means from the atmosphere during the subsequent vacuum phase of operation.

In the light of tests made by the coffee industry and scientific institutions, the following requirements are believed to be essential for producing a coffee infusion of the highest quality:

(a) All parts of the infusing device which come into contact with the beverage should be of glass, porcelain, stainless steel, or similar material which is chemically inert to coffee.

(b) The temperature of the water during infusion with the ground roasted coffee should be from 85 to 95 degrees centigrade.

(c) The infusion period should be brief; preferably 1 to 2 minutes.

(d) At the end of the infusion period, the beverage should be quickly filtered from the grounds.

In the course of the heating of the water in the lower container of a conventional coffee maker of the pressure-vacuum type which is not vented, expanding entrapped air and evolved water vapor force a portion of the said water up into the upper container thereof for infusion with the ground roasted coffee therein before its temperature is high enough to produce the most desirable and economical beverage. However, it has long been known in the art that the flow of water from the lower to the upper container of a pressure-vacuum type of coffee maker can be delayed until said water has attained a predetermined temperature by providing means for venting the lower container either into the upper container, through the wall of its tubular stem, or to the atmosphere. In such a device, where the upper container is made of glass (which is highly desirable), it is very difficult to form a vent therein within the required size limits. On the other hand, the incorporation of a vent in a member of flexible material, such as rubber, interposed between the two containers, is extremely easy to accomplish since it can be formed therein as an integral part of the molding of the member. However, when the vent is incorporated in such a flexible member of a coffee maker having a glass upper container with an integral tubular stem, it must discharge into the atmosphere, and therefore some means must also be provided for keeping the vent passage closed during the vacuum phase of operation of the device. The device set forth in my copending application, Serial No. 702,555, now Patent No. 2,571,015, provides automatic means for thus venting the lower container to the atmosphere during the pressure phase of operation, and for sealing the vent from the atmosphere during the vacuum phase of operation. In that device, both the vent and the sealing means are incorporated in a flexible connecting member interposed between the two containers. The present invention provides an improved coffee maker embodying the same basic principles of operation as that device plus certain new features.

The basic object of the present invention, and of the earlier related invention as well, is to provide in a device of the pressure-vacuum type for making infusions of coffee, tea, or the like, venting means and valve-like sealing means between said venting means and the atmosphere which function automatically during the operation of said device whereby the infusion can be accomplished within the correct temperature range, and can then be quickly filtered from the grounds.

Another object of the present invention is to provide a construction of the valve-like sealing means which is practical, very positive in action, and not subject to deterioration after long periods of use.

Another object of the present invention is to provide, in a flexible member which is normally attached to the upper container of the coffee maker and positioned in the neck of the lower container thereof during the infusing operation, a flange of such configuration that it will resist to a reasonable degree the usual pressure which tends to force the member and the attached upper container up out of the lower container during the pressure phrase of operation, but that may be easily removed from the lower container by manually pulling up with a force in excess of a predetermined amount.

Other objects and advantages of the invention should be apparent from the drawings, and from the description and discussion of the invention which follows.

A preferred form of coffee maker incorporating my invention is illustrated in Figures 1, 2, 3, and 4 of the accompanying drawings. Another form, similar except for the location of the vent, is illustrated in Figures 5, 6, and 7. In these drawings:

Figure 2 is a plan view showing in detached relationship the flexible member of Figure 1;

Figure 3 is an elevation view, partly in section, of the flexible member otherwise illustrated in Figure 2;

Figure 4 is a fragmentary assembly of the same elements illustrated in Figure 1 in a partly separated state to show the manner in which flexure of the flexible member takes place as the upper container of the coffee maker is removed in the normal manner from the lower container;

Figure 5 is a plan view of a flexible member similar to the member illustrated in Figures 2 and 3 except that the vent through the flange is replaced by an indentation in the rim of the flange which, when said member is installed as in Figure 7, provides a vent;

Figure 6 is an elevation view, partly in section, of the flexible member otherwise illustrated in Figure 5.

Figure 1:
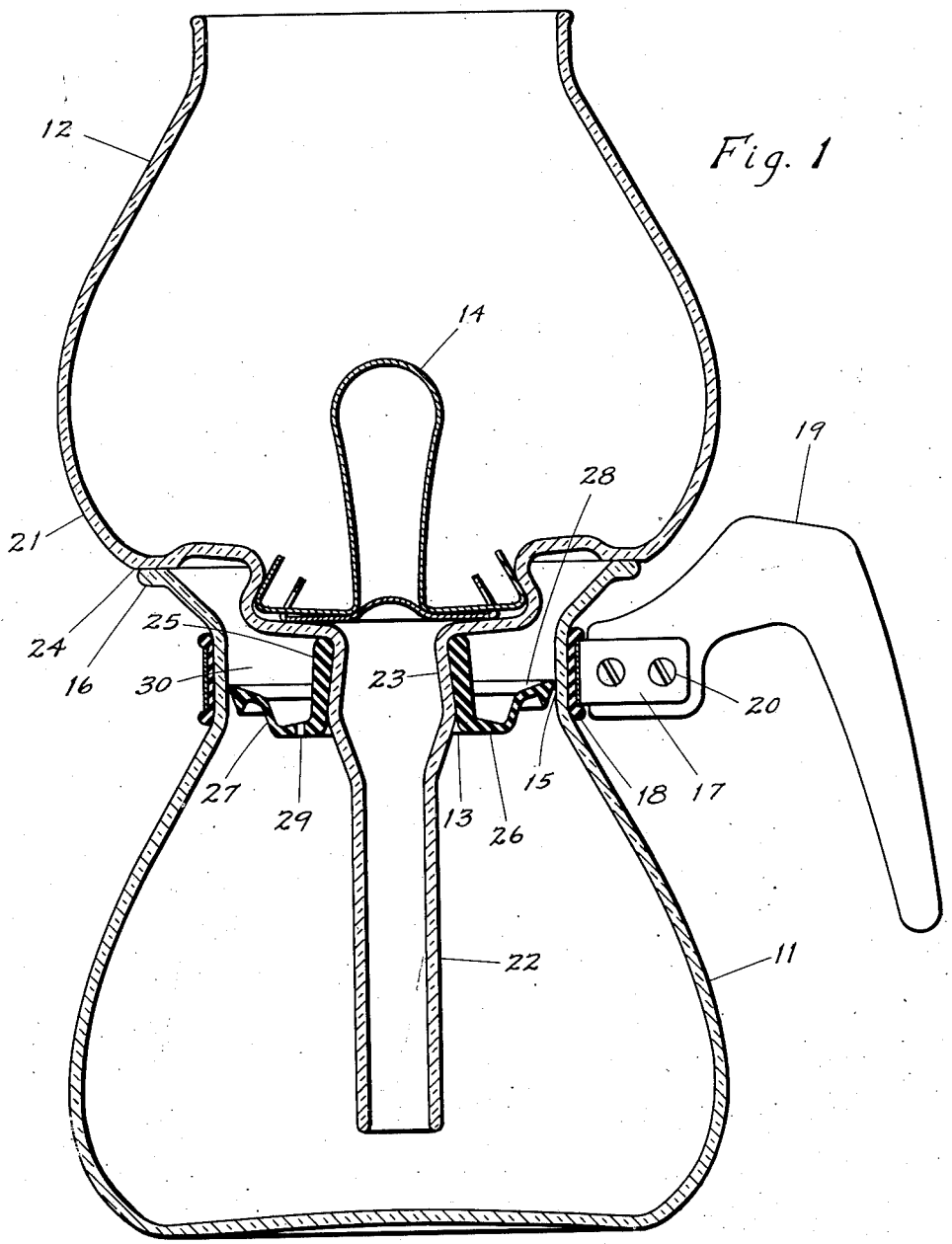
Figure 1 is a central vertical section of a preferred form of the coffee maker wherein the vent is located in the flange of the flexible member.

The coffee maker illustrated in Figures 1, 2, 3, and 4 comprises essentially a lower container 11, an upper container 12, a flexible member 13, and a filter 14. The upper and lower containers are preferably made of heat-resisting glass. The filter is preferably of light-weight stainless-steel construction of the type illustrated, which is covered by Patent No. 2,506,013, but it should be understood that other types of filters may be employed. The lower container 11 is provided with an open neck comprising a substantially cylindrical portion 15 surmounted by an outwardly flared portion having the top surface of its rim 16 ground to provide an annular flat upwardly facing sealing surface. A metal band 17 surrounds the cylindrical portion of the neck and is separated therefrom by a cushion strip 18 of resilient material, such as cork or rubber. The ends of the metal band 17 are formed for attachment to a handle 19 by bolts 20. The upper container 12 comprises a bowl 21 and an integral tube 22 depending therefrom, and is formed as shown in Figure 1 to provide an annular shoulder 23 to retain the flexible member 13, an annular seat and an annular retaining shoulder for the filter 14, and an annular external ridge 24 projecting downward from the bowl and ground flat to provide an annular flat downwardly facing sealing surface to mate with the upwardly facing sealing surface of the rim 16 of the lower container. The flexible member 13 is located between the upper and lower containers, 12 and 11, as shown in Figure 1, and functions, as will be explained hereafter, to provide the proper venting of the lower container, to allow the upper container to function as a valve where it rests on the lower container, to prevent excessive displacement upward of the upper container due to the pressure normally developed in the lower container during the pressure phase of operation, and to generally stabilize the two containers with respect to each other. The flexible member 13 is preferably molded in one piece of soft rubber in the form illustrated in Figures 2 and 3, and adapted to surround the tube 22 and be retained in air-tight engagement therewith by the shoulder 23 when installed thereon as shown in Figure 1. The flexible member consists of the central body 25 and a diaphragm flange extending generally outward therefrom which preferably comprises an annular disc-like inner portion 26, an annular intermediate portion 27 resembling a section of a hollow inverted cone and extending outward and steeply upward from the outer boundary of the inner portion 26, and an annular brim-like portion 28 extending outward and less steeply upward from the top of the intermediate portion 27, so that the included angle between and below the two portions is less than 180 degrees, and having an outside diameter in the undeflected state, as in Figures 2 and 3, slightly larger than the inside diameter of the cylindrical portion 15 of the lower-container neck. With this preferred configuration, when the flexible member 13 is installed in the cylindrical portion 15, as in Figure 1, the brim-like portion 28 is flexed upward and compressed to a smaller diameter, the rim thereof effecting annular air-tight engagement with said cylindrical portion. This compression, in turn, compresses the attached intermediate portion 27 to a slightly steeper and more nearly cylindrical shape since this portion is compressed little if any at the bottom where it joins the disc-like inner portion 26. The deformation of the portions 27 and 28 takes place principally in the lateral and circumferential directions in the flange material, and not radially inward, and, because of this and its preformed upward slope toward its edge, the brim-like portion 28 easily adapts itself to wide variations in neck diameters while still retaining its diaphragm characteristics. In a commercial coffee maker employing a glass lower container, it is desirable that the diaphragm flange have this property because of the inherently wide variations in glassware as manufactured. The preformed upward slope of the brim-like portion 28 also contributes another desired characteristic, the property of being more difficult to remove from the lower-container neck than to install therein. If pressure within the lower container 11 tends to force the flexible member 13 upward, the brim-like portion 28 tends to become flatter and larger in diameter, and thus its rim adheres more tightly to the wall of the cylindrical portion 15 of the neck. This property and the inherent diaphragm characteristics of the flange thus tend to maintain the upper container 12 in valve-like relationship with the lower container 11, offering very little resistance to a small upward displacement of the upper container, but effectively preventing it from moving upward to any great extent, during normal operation of the coffee maker. However, when the upper container is to be removed from the lower, as at the conclusion of the coffee-making process, the brim-like portion 28 "doubles back" as illustrated in Figure 4 as the upper container is pulled upward with a force in excess of a predetermined amount, and in this state offers comparatively little resistance to its removal from the lower-container neck. In a device of the type illustrated, the maximum pressure developed in the lower container has been found to occur in the final stage of the pressure phase of operation, just before the transfer of water from the lower to the upper container has been completed, and usually ranges from 6 to 7 ounces per square inch for a device of 8-cup capacity. Therefore, the flexible member 13 should, for such a device, be designed so that an upwardly acting force of 8 ounces per square inch or more is required to cause the brim-like portion 28 to "double back" as shown in Figure 4. To prevent excessive distortion of the brim-like portion 28 from a horizontal plane of contact with the cylindrical portion 15 of the neck when the diameter of the cylindrical portion is considerably less than the diameter of the undeflected brim-like portion, I have found it desirable to form the outer rim of said brim-like portion as shown in Figure 3 to reinforce it against bending up or down in a circumferential direction. This reinforcement also increases the resistance of the brim-like portion to slipping upward in the cylindrical portion of the neck during the pressure phase of operation, without affecting to any great extent the desired flexure characteristics. While a flexible member having a flange structure as described and illustrated is highly desirable for the reasons stated, it should be understood that the diaphragm flange of said member may have a plain up-turned rim instead of the more complex form, or that, if the neck of the lower container is made small enough in diameter, the diaphragm flange may be plain and more or less flat or of similar non-distinctive configuration. A flexible member wherein the rim of the diaphragm flange is of plain up-turned configuration is more difficult to remove from the neck of a lower container, but it otherwise functions in a quite satisfactory manner in a coffee maker of the type described herein.

In addition to the features of the flexible member 13 previously enumerated and described, a vent 29 is located therein, preferably in the relatively flat inner portion 26 of the diaphragm flange since, in this position, it can easily be molded therein when the member is made and is also less subject to deformation during operation of the coffee maker. The two requirements for the vent are that it be of a particular size (cross section) and that it be located so that it connects the space below the flexible member 13 with the space above said member. It will therefore be obvious that the vent may be located at any point in the flexible member 13 which satisfies the latter requirement, and also that it may be provided merely by a notch or indentation in the rim of the brim-like portion 28, or in the inner wall of the body 25 of the member, which, in cooperation with the adjacent wall of the cooperating container, will form a vent. A flexible member 31 having the notch-type vent 34 in the rim of the brim-like portion is illustrated in Figures 5 and 6, and is shown incorporated in a coffee maker in Figure 7.

Figure 7:
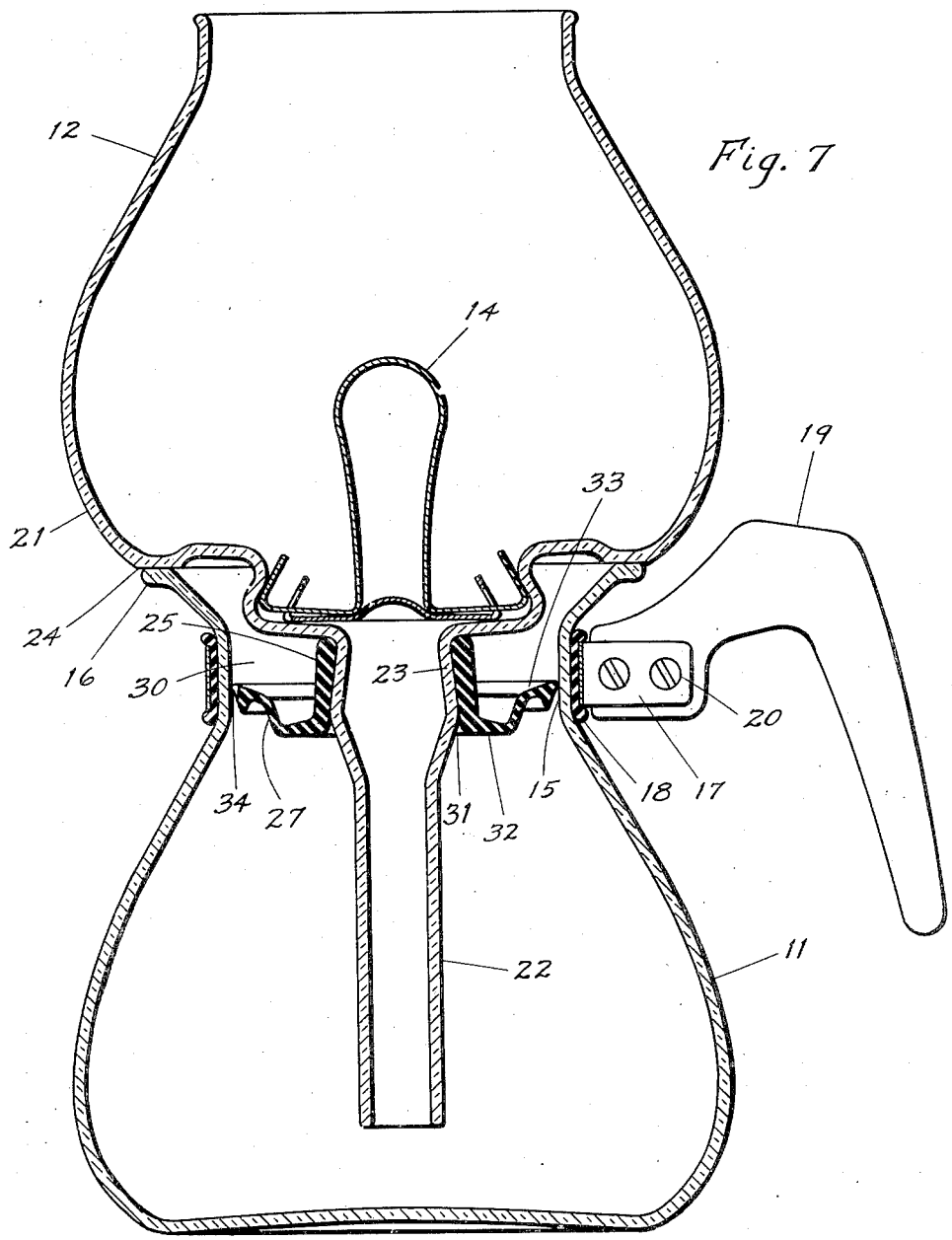
Figure 7 is a central vertical section of the second form of coffee maker, which is similar to the device illustrated in Figure 1 except that it incorporates the flexible member illustrated in Figures 5 and 6 instead of the member illustrated in Figures 2 and 3.

When the coffee makers are assembled for use, as shown in Figures 1 and 7, the upper container 12 normally rests lightly upon the lower container 11 by virtue of the engagement of the ground-glass sealing surfaces of the rim 16 and the ridge 24, the body 25 of the flexible member, 13 or 31, is in air-tight engagement with the tube 22 of the upper container, and the periphery of the brim-like portion, 28 or 33, of the flexible member is in air-tight engagement with the cylindrical portion 15 of the neck of the lower container 11. By reference to Figures 1 and 7, it will be seen that, in this state, an annular chamber 30 is thus formed between the top surface of the flexible member, 13 or 31, and the adjacent walls of the upper and lower containers, 12 and 11, thereabove within the annular sealing line of the two containers. It may also be seen from Figures 1 and 7 that the vent itself, 29 or 34, remains open at all times to allow escape therethrough of air and vapor from the interior of the lower container 11 into the chamber 30. In order for the coffee makers to operate properly during the pressure phase, it is necessary that the air and vapor passing upward through the vent be, in turn, allowed to escape into the atmosphere before the pressure in the lower container exceeds a predetermined value, hereinafter termed the critical pressure. This critical pressure is determined by the vertical distance the water from the lower container 11 can rise through the tube 22 before spreading to any great extent over the bottom of the bowl 21 of the upper container 12 and thus increasing materially the effective weight thereof. This distance is normally taken as the height from the normal surface of the water in the lower container 11 to the bottom surface of the filter 14, and the resulting critical pressure is calculated on the basis of .58 ounce per square inch pressure per inch of vertical height. When the critical pressure has been determined, the total weight of the upper container, the filter and the amount of ground coffee it will normally contain, and the attached member, is divided by the critical pressure to determine the projected area (in square inches) of the bowl 21 of the upper container which must exist within the annular sealing line at 24. In a practical coffee maker, the required diameter of this area, and of the corresponding diameter of the rim 16 of the lower container 12, result in a configuration about as illustrated in Figures 1 and 7. Since it is desirable to keep the diameter of the flexible member, 13 or 31, within a reasonable limit to prevent excessive internal pressure being exerted against it, a ratio of the diameter of the cylindrical portion 15 of the neck to the diameter of the rim 16 of 3 to 4 has been found to be practical. In an 8-cup coffee maker, the average total weight of the upper container and its dry contents (as enumerated previously) can be kept as low as 14 ounces if a light-weight filter, such as that illustrated in Figures 1 and 7, is employed. With this upper-container weight, the diameter within the sealing surfaces at the rim 16 can be made 4 inches, and a diameter of 3 inches for the cylindrical portion 15 of the neck has been found to be satisfactory. The functioning of the vent itself to delay the flow of water up into the bowl of the upper container until the water has attained a predetermined temperature is well known in the art. It may be stated here that such a vent functions as it does by virtue of the fact that the rate of escape of air or vapor through it varies substantially in proportion to the square root of the difference in the pressures existing within and without it. A vent having a cross-section area of approximately .0016 square inch (or approximately .045 inch in diameter) has been found to be satisfactory for producing an initial temperature of approximately 85 to 95 degrees centigrade of the water in the upper bowl of a coffee maker of the construction illustrated and of 8-cup capacity.

The coffee maker shown in Figure 1 and described herein operates as follows; operation of the coffee maker shown in Figure 7 is similar:

Water, preferably fresh and cool or cold, of the desired amount within the working capacity of the coffee maker is placed in the lower container 11, and the upper container 12 and the attached flexible member 13 are inserted down into the neck of the lower container until the ridge 24 of the upper container rests on the rim 16 of the lower container. Due to a slight spring-back normally present in the diaphragm flange of the flexible member 13, the ridge 24 probably will not at this stage rest in annular sealing engagement with the rim 16, but such engagement is possible. With the filter 14 installed in the upper container 12 as shown, the proper amount of ground roasted coffee is dumped into the bowl 21 of the upper container. The coffee maker is then placed upon a source of heat. As the temperature of the water in the lower container 11 rises, the air entrapped above the water therein is also heated and therefore expands. An increasing amount of vapor is also evolved from the water as it is heated. As a result of this and the heating and expansion of the entrapped air, the pressure in the lower container, above the water, rises and forces the water level in the tube 22 of the upper container to rise also. At the same time, some of the entrapped air and vapor flows through the vent 29 into the chamber 30, tending to equalize the pressure in the chamber with that existing in the lower container if the upper container 12 is in air-tight engagement with the lower container 11. If the containers are not in air-tight engagement, the vented air and vapor escape to the atmosphere between the rim 16 and the ridge 24 substantially as fast as they flow into the chamber 30. As the heating continues, if the upper and lower containers are in air-tight engagement, the pressure in the lower container 11 and in the chamber 30 rises until the critical pressure is reached, at which time the water level in the tube 22 will have risen to about the level of the filter 14. When this critical pressure is reached, it forces the upper container 12 upward slightly to break the seal between the rim 16 and the ridge 24, and thus permits air or vapor, or both, to escape from the chamber 30 into the atmosphere. If the pressure drops below the critical value, the air-tight seal can be re-established, and, if the pressure again rises above the critical value, the air-tight seal is again broken. In this way, the water in the tube 22 is prevented from rising into the bowl 21 until it has attained the predetermined critical temperature. When the critical temperature is attained, the vent 29 can no longer discharge the vapor (or steam) as fast as it is evolved, even though the two containers now remain continually out of air-tight engagement, and the pressure in the lower container 11 therefore rises above the critical value. This higher pressure forces the heated water from the lower container 11 up through the tube 22 into the bowl 21 of the upper container until the water level in the lower container drops below the lower end of the tube. As water is thus transferred to the upper container and spreads outward into the bowl thereof, its added weight tends to effect and maintain an air-tight seal between the two containers, and, when the water in the lower container drops below the lower end of the tube 22, the steam from the water remaining in the lower container (which normally is now boiling) escapes freely up through the tube, past the filter 14 by unseating it slightly, and through the infusion in the bowl 21 into the atmosphere. The escaping steam maintains the infusing water and ground coffee in the upper bowl as long as the water remaining in the lower container is allowed to boil. This infusing stage is allowed to continue for a short period of time (preferably about 1 minute or less), and the coffee maker is then removed from its source of heat. Shortly thereafter (usually in about 30 seconds or less), the steam in the lower container 11 suddenly condenses and a strong partial vacuum is thus formed in the lower container. This partial vacuum pulls the upper container more tightly against the lower container at the sealing surfaces, and, at the same time, draws the beverage from the bowl of the upper container down past the filter 14 and through the tube 22 into the lower container. When this has been completed, air is drawn down through the tube 22 to relieve the remaining partial vacuum in the lower container. The upper container 12 is then pulled upward, whereupon the brim-like portion 28 of the flexible member normally doubles back and assumes a shape more or less as shown in Figure 4, and the upper container and attached flexible member are easily removed from the neck of the lower container. Obviously, tea or other beverages requiring a similar infusion method can advantageously be made in this coffee maker in a similar manner.

It will be understood that forms of coffee makers and the elements thereof other than those specifically illustrated and described herein may be devised without departing from the spirit of my invention, and the exclusive use of all such embodiments and modifications within the scope of the appended claims is contemplated.

The features embodied in this invention, other than the intermediate portion 27 and the brim-like portions, 28 and 33, of the flexible member and the mating sealing surfaces provided on the rim 16 of the lower container and the ridge 24 of the upper container, were first disclosed and claimed by me in combination with other features in coffee makers in an application, Serial No. 677,756, filed June 19, 1946, and also were subsequently disclosed and claimed by me in combination with other features in coffee makers in my copending application, Serial No. 702,555, filed October 10, 1946, which was a continuation-in-part of the original application. The original application, Serial No. 677,756, but not the invention disclosed therein, was abandoned. In these two prior applications, an upper flange on the flexible member in cooperation with the flared neck of the lower container was utilized and claimed in combinations in coffee makers in place of the mating sealing surfaces of the two containers as embodied in the present invention and claimed herein. In my copending application, Serial No. 702,555, the diaphragm flange of the flexible member was provided with a plain upturned rim in place of the more complex arrangement consisting of the intermediate and brim-like portions as embodied in the present invention and claimed herein.

I claim:

1. A beverage maker of the pressure-vacuum type comprising a lower container having at the top thereof an open neck provided thereabout with a continuous sealing surface; an open-top upper container having at the bottom thereof a tubular portion extending downward into said lower container through said neck and, surrounding said tubular portion, a continuous sealing surface adapted to seat as a valve on the said sealing surface of the lower container and disposed in valve-like relationship therewith; means in said upper container for filtering liquid therefrom; and a member engaging said upper container in substantially air-tight relationship within said sealing surface thereof and about said tubular portion, the said member having a vent therein and comprising a flexible diaphragm flange engaging said neck thereabout within said sealing surface of said neck in substantially air-tight relationship; a chamber being formed between said member and the adjacent walls of said upper and lower containers defined by their said sealing surfaces and said member, and said vent connecting said chamber with the interior of said lower container; whereby regulated escape of air and vapor from the interior of said lower container through said vent into said chamber, and thence between said sealing surfaces to the atmosphere, will occur during the pressure phase of operation of said beverage maker, but air will be prevented from entering between said sealing surfaces into said lower container during the vacuum phase of operation of said beverage maker.

2. A beverage maker of the pressure-vacuum type comprising a lower container having at the top thereof an open neck provided with a cylindrical portion and thereabout an annular upwardly facing sealing surface; an open-top upper container having at the bottom thereof a tubular portion extending downward into said lower container through said neck and, surrounding said tubular portion, an annular downwardly facing sealing surface adapted to seat as a valve on the said sealing surface of the lower container and disposed in valve-like relationship therewith; means in said upper container for filtering liquid therefrom; and an annular member affixed in substantially air-tight relationship to said upper container within said sealing surface thereof and about said tubular portion, the said member having a vent therein and comprising a flexible diaphragm flange having its rim in annular and substantially air-tight engagement with said cylindrical portion; the said member and the adjacent walls of said upper and lower containers thereabove within their said sealing surfaces forming a chamber, and said vent connecting said chamber with the interior of said lower container; whereby regulated escape of air and vapor from the interior of said lower container through said vent into said chamber, and thence between said sealing surfaces to the atmosphere, will occur during the pressure phase of operation of said beverage maker, but air will be prevented from entering between said sealing surfaces into said lower container during the vacuum phase of operation of said beverage maker.

3. A beverage maker of the pressure-vacuum type comprising a lower container having at the top thereof an open neck provided with a cylindrical portion and thereabout an annular upwardly facing sealing surface; an open-top upper container having at the bottom thereof a tubular portion extending downward into said lower container through said neck and, surrounding said tubular portion, an annular downwardly facing sealing surface adapted to seat as a valve on the said sealing surface of the lower container and disposed in valve-like relationship therewith; means in said upper container for filtering liquid therefrom; and an annular member affixed in substantially air-tight relationship to said upper container within said sealing surface thereof and about said tubular portion, the said member having a vent therein and comprising a flexible diaphragm flange having a rim portion extending upwardly and outwardly and peripherally engaging said cylindrical portion in annular and substantially air-tight relationship; the said member and the adjacent walls of said upper and lower containers thereabove within their said sealing surfaces forming a chamber, and said vent connecting said chamber with the interior of said lower container; whereby regulated escape of air and vapor from the interior of said lower container through said vent into said chamber, and thence between said sealing surfaces to the atmosphere, will occur during the pressure phase of operation of said beverage maker, but air will be prevented from entering between said sealing surfaces into said lower container during the vacuum phase of operation of said beverage maker.

4. A beverage maker of the pressure-vacuum type comprising a lower container having at the top thereof an open neck which includes a cylindrical portion and thereabove an outwardly flared portion having at the top thereof an annular flat upwardly facing sealing surface; an open-top upper container having at the bottom thereof a tubular portion extending downward into said lower container through said neck and, surrounding said tubular portion, an annular flat downwardly facing sealing surface adapted to seat as a valve on the said sealing surface of the lower container and resting thereon; a filter in said upper container; and a flexible member comprising an annular central body affixed in air-tight relationship to said upper container within said sealing surface thereof and about said tubular portion, and a diaphragm flange; the said diaphragm flange comprising an annular disc-like portion extending outwardly from said body and having a vent therein, an annular intermediate portion resembling a transverse section of a hollow inverted cone and extending outwardly and upwardly from the outer boundary of said disc-like portion, and an annular brim-like portion extending outwardly and upwardly from the top of said intermediate portion at an attitude less steep than the attitude of said intermediate portion and peripherally engaging said cylindrical portion in annular air-tight relationship; the said member and the adjacent walls of said upper and lower containers thereabove within their said sealing surfaces forming a chamber, and said vent connecting said chamber with the interior of said lower container; whereby regulated escape of air and vapor from the interior of said lower container through said vent into said chamber, and thence between said sealing surfaces to the atmosphere, will occur during the pressure phase of operation of said beverage maker, but air will be prevented from entering between said sealing surfaces into said lower container during the vacuum phase of operation of said beverage maker.

5. A beverage maker as defined in claim 4 wherein the said brim-like portion comprises an annular reinforcing portion extending downward therefrom near the rim thereof.

6. A beverage maker as defined in claim 5 wherein the said reinforcing portion is of substantially triangular cross section.

7. A beverage maker of the pressure-vacuum type comprising a lower container having at the top thereof an open neck provided thereabout with a continuous sealing surface; an open-top upper container having at the bottom thereof a tubular portion extending downward into said lower container through said neck and, surrounding said tubular portion, a continuous sealing surface adapted to seat as a valve on the said sealing surface of the lower container and disposed in valve-like relationship therewith; means in said upper container for filtering liquid therefrom; and a member engaging said upper container within said sealing surface thereof and about said tubular portion, and comprising a flexible diaphragm flange engaging said neck thereabout within said sealing surface of said neck; a chamber being formed between said member and the adjacent walls of said upper and lower containers defined by their said sealing surfaces and said member; the said member having an indentation therein which, with the adjacent wall of one of the said containers, forms a vent connecting said chamber with the interior of said lower container, the engagement of said member with said containers being substantially airtight except at said vent; whereby regulated escape of air and vapor from the interior of said lower container through said vent into said chamber, and thence between said sealing surfaces to the atmosphere, will occur during the pressure phase of operation of said beverage maker, but air will be prevented from entering between said sealing surfaces into said lower container during the vacuum phase of operation of said beverage maker.

8. A beverage maker of the pressure-vacuum type comprising a lower container having at the top thereof an open neck provided with a cylindrical portion and thereabout an annular upwardly facing sealing surface; an open-top upper container having at the bottom thereof a tubular portion extending downward into said lower container through said neck and, surrounding said tubular portion, an annular downwardly facing sealing surface adapted to seat as a valve on the said sealing surface of the lower container and disposed in valve-like relationship therewith; means in said upper container for filtering liquid therefrom; and an annular member affixed in substantially air-tight relationship to said upper container within said sealing surface thereof and about said tubular portion, and comprising a flexible diaphragm flange having an indentation in its rim, said rim, except at said indentation, being in substantially air-tight engagement peripherally with said cylindrical portion; the said member and the adjacent walls of said upper and lower containers thereabove within their said sealing surfaces forming a chamber, and said indentation, with the adjacent wall of said cylindrical portion, forming a vent which connects said chamber with the interior of said lower container; whereby regulated escape of air and vapor from the interior of said lower container through said vent into said chamber, and thence between said sealing surfaces to the atmosphere, will occur during the pressure phase of operation of said beverage maker, but air will be prevented from entering between said sealing surfaces into said lower container during the vacuum phase of operation of said beverage maker.

9. A beverage maker of the pressure-vacuum type comprising a lower container having at the top thereof an open neck provided with a cylindrical portion and thereabout an annular upwardly facing sealing surface; an open-top upper container having at the bottom thereof a tubular portion extending downward into said lower container through said neck and, surrounding said tubular portion, an annular downwardly facing sealing surface adapted to seat as a valve on the said sealing surface of the lower container and disposed in valve-like relationship therewith; means in said upper container for filtering liquid therefrom; and an annular member affixed in substantially air-tight relationship to said upper container within said sealing surface thereof and about said tubular portion, and comprising a flexible diaphragm flange having a rim portion extending upwardly and outwardly and having an indentation therein, said rim portion, except at said indentation, being in substantially air-tight engagement peripherally with said cylindrical portion; the said member and the adjacent walls of said upper and lower containers thereabove within their said sealing surfaces forming a chamber, and said indentation, with the adjacent wall of said cylindrical portion, forming a vent which connects said chamber with the interior of said lower container; whereby regulated escape of air and vapor from the interior of said lower container through said vent into said chamber, and thence between said sealing surfaces to the atmosphere, will occur during the pressure phase of operation of said beverage maker, but air will be prevented from entering between said sealing surfaces into said lower container during the vacuum phase of operation of said beverage maker.

10. A beverage maker of the pressure-vacuum type comprising a lower container having at the top thereof an open neck which includes a cylindrical portion and thereabove an outwardly flared portion having at the top thereof an annular flat upwardly facing sealing surface; an open-top upper container having at the bottom thereof a tubular portion extending downward into said lower container through said neck and, surrounding said tubular portion, an annular flat downwardly facing sealing surface adapted to seat as a valve on the said sealing surface of the lower container and resting thereon; a filter in said upper container; and a flexible member comprising an annular central body affixed in air-tight relationship to said upper container within said sealing surface thereof and about said tubular portion, and a diaphragm flange; the said diaphragm flange comprising an annular disc-like portion extending outwardly from said body, an annular intermediate portion resembling a transverse section of a hollow inverted cone and extending outwardly and upwardly from the outer boundary of said disc-like portion, and an annular brim-like portion extending outwardly and upwardly from the top of said intermediate portion at an attitude less steep than the attitude of said intermediate portion and having an indentation in its rim, said rim, except at said indentation, being in air-tight engagement peripherally with said cylindrical portion; the said member and the adjacent walls of said upper and lower containers thereabove within their said sealing surfaces forming a chamber, and said indentation, with the adjacent wall of said cylindrical portion, forming a vent which connects said chamber with the interior of said lower container; whereby regulated escape of air and vapor from the interior of said lower container through said vent into said chamber, and thence between said sealing surfaces to the atmosphere, will occur during the pressure phase of operation of said beverage maker, but air will be prevented from entering between said sealing surfaces into said lower container during the vacuum phase of operation of said beverage maker.

11. A beverage maker as defined in claim 10 wherein the said brim-like portion comprises an annular reinforcing portion extending downward therefrom near the rim thereof.

12. A beverage maker as defined in claim 11 wherein the said reinforcing portion is of substantially triangular cross section.

13. A beverage maker of the pressure-vacuum type comprising a lower container having at the top thereof an open neck provided thereabout with a continuous sealing surface; an open-top upper container having at the bottom thereof a tubular portion extending downward into said lower container through said neck and, surrounding said tubular portion, a continuous sealing surface adapted to seat as a valve on the said sealing surface of the lower container and disposed in valve-like relationship thereon; means in said upper container for filtering liquid therefrom; and a member disposed in said neck about said tubular portion in substantially air-tight engagement peripherally with said neck and axially with said upper container and thus forming a chamber with the adjacent walls of said neck and said upper container extending thereto from their said sealing surfaces, the said member having a vent therein and comprising, between said chamber and the interior of said lower container, a flexible annular diaphragm portion, the said vent connecting said chamber with the interior of said lower container; whereby regulated escape of air and vapor from the interior of said lower container through said vent and between said upper and lower containers and their said sealing surfaces to the atmosphere will occur during the pressure phase of operation of said beverage maker, but air will be prevented from entering between said sealing surfaces into said lower container during the vacuum phase of operation of said beverage maker.

14. A beverage maker of the pressure-vacuum type comprising a lower container having at the top thereof an open neck provided thereabout with a continuous sealing surface; an open-top upper container having at the bottom thereof a tubular portion extending downward into said lower container through said neck and, surrounding said tubular portion, a continuous sealing surface adapted to seat as a valve on the said sealing surface of the lower container and disposed in valve-like relationship thereon; means in said upper container for filtering liquid therefrom; and a member disposed in said neck about said tubular portion in engagement peripherally with said neck and axially with said upper container and thus forming a chamber with the adjacent walls of said neck and said upper container extending thereto from their said sealing surfaces, the said member having an indentation therein which, in cooperation with the adjacent wall of one of the said containers, forms a vent connecting said chamber with the interior of said lower container, the said peripheral and axial engagement of said member with said neck and said upper container being substantially air-tight except at said vent, and the said member comprising, between said chamber and the interior of said lower container, a flexible annular diaphragm portion; whereby regulated escape of air and vapor from the interior of said lower container through said vent and between said upper and lower containers and their said sealing surfaces to the atmosphere will occur during the pressure phase of operation of said beverage maker, but air will be prevented from entering between said sealing surfaces into said lower container during the vacuum phase of operation of said beverage maker.

JOHN C. COLUMBUS.

REFERENCES CITED

The following references are of record in the file of this patent:

UNITED STATES PATENTS

| Number | Name | Date |
| --- | --- | --- |
| 633,468 | McCarty | Sept. 19, 1899 |
| 1,494,691 | Loggie et al. | Mar. 20, 1924 |
| 2,162,455 | Hoge | June 13, 1929 |
| 2,359,405 | Cory | Oct. 3, 1944 |
| 2,464,722 | Sacker | Mar. 15, 1949 |